(12) United States Patent
Fan et al.

(10) Patent No.: US 6,400,844 B1
(45) Date of Patent: Jun. 4, 2002

(54) METHOD AND APPARATUS FOR SEGMENTING DATA TO CREATE MIXED RASTER CONTENT PLANES

(75) Inventors: Zhigang Fan, Webster; Ming Xu, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/203,870

(22) Filed: Dec. 2, 1998

(51) Int. Cl.[7] .................................................. G06K 9/34
(52) U.S. Cl. ........................ 382/173; 382/176; 382/199; 358/462; 358/458
(58) Field of Search ................................ 382/173, 176, 382/224, 162, 235, 232, 199, 286; 358/458, 462, 530, 296, 433

(56) References Cited

U.S. PATENT DOCUMENTS

| | | | |
|---|---|---|---|
| 5,014,124 A | 5/1991 | Fujisawa | 358/75 |
| 5,060,980 A | 10/1991 | Johnson et al. | 283/70 |
| 5,251,271 A | 10/1993 | Fling | 382/162 |
| 5,303,313 A | 4/1994 | Mark et al. | 382/235 |
| 5,432,870 A | 7/1995 | Schwartz | 382/232 |
| 5,767,978 A * | 6/1998 | Revankar et al. | 358/296 |
| 5,778,092 A * | 7/1998 | Macleod et al. | 382/176 |
| 5,784,175 A | 7/1998 | Lee | 358/433 |
| 5,949,555 A | 9/1999 | Sakai et al. | 358/462 |

FOREIGN PATENT DOCUMENTS

EP    0 358 815 A1    3/1990

* cited by examiner

Primary Examiner—Phuoc Tran
Assistant Examiner—Ali Bayat
(74) Attorney, Agent, or Firm—Michelle W. Waites; Mark Z. Dudley (57) ABSTRACT

An improved technique for compressing a color or gray scale pixel map representing a document using an MRC format includes a method of segmenting an original pixel map into two planes, and then compressing the data or each plane in an efficient manner. The image is segmented by separating the image into two portions at the edges. One plane contains image data for the dark sides of the edges, while image data for the bright sides of the edges and the smooth portions of the image are placed on the other plane. This results in improved image compression ratios and enhanced image quality.

18 Claims, 9 Drawing Sheets

METHOD AND APPARATUS FOR SEGMENTING DATA TO CREATE MIXED RASTER CONTENT PLANES

FIELD OF THE INVENTION

This invention relates generally to image processing and, more particularly, to techniques for compressing the digital representation of a document.

BACKGROUND OF THE INVENTION

Documents scanned at high resolutions require very large amounts of storage space. Instead of being stored as is, the data is typically subjected to some form of data compression in order to reduce its volume, and thereby avoid the high costs associated with storing it. "Lossless" compression methods such as Lempel-Ziv Welch (LZW) do not perform particularly well on scanned pixel maps. While "lossy" methods such as JPEG work fairly well on continuous-tone pixel maps, they do not work particularly well on the parts of the page that contain text. To optimize image data compression, techniques, which can recognize the type of data being compressed, are needed.

One approach to satisfy the compression needs of differing types of data has been to use document image representation (DIR) which employs a Mixed Raster Content (MRC) format to describe the image. The image—a composite image having text intermingled with color or gray scale information—is segmented into two or more planes, generally referred to as the upper and lower plane, and a selector plane is generated to indicate, for each pixel, which of the image planes contains the actual image data that should be used to reconstruct the final output image. Segmenting the planes in this manner can improve the compression of the image because the data can be arranged such that the planes are smoother and more compressible than the original image. Segmentation also allows different compression methods to be applied to the different planes, thereby allowing a compression technique that is most appropriate for the data residing thereon can be applied to each plane.

An approach such as this is discussed in U.S. Pat. No. 5,778,092 to MacLeod et al. issued Jul. 7, 1998, the contents of which are hereby incorporated by reference. MacLeod et al. discloses a technique for compressing a color or gray scale pixel map that represents a document. The pixel map is decomposed into a three-plane representation—a reduced-resolution foreground plane, a reduced-resolution background plane, and a high-resolution binary selector plane. The foreground plane contains the color or gray scale information of foreground items such as text. The background plane contains the color or gray scale information for the "background" of the page and the continuous tone pictures that are contained on the page. The selector plane stores information for selecting from either the foreground plane or background plane during decompression.

The present invention is directed to segmenting color image data using the MRC format. Edges are generally defined as sharp discontinuities between regions of two constant colors or large sections of light intensity values. Here, edges of the image are separated into two portions. The foreground layer generally contains information about the darker sides, while the background layer contains the information about the smooth regions of the image and the brighter sides of the edges. Segmentation is performed by viewing each block in stripes (where the height of each stripe is equal to the size of the block) and by processing each block stripe by stripe from the top of the image to the bottom.

The following disclosures may be relevant to aspects of the present invention:

U.S. Pat. No. 5,251,271 to Fling issued Oct. 5, 1993 discloses a method for registering digitized multi-plane color images. The method designates one plane as the reference plane and registers each of the other warped planes with the reference plane. Each plane comprises pixels representing luminosity values having scalar x and y coordinates representing positions in the horizontal and vertical directions, respectively, of the plane. The planes are divided into regions. Correlation values are calculated for regions within the divisional region of the reference plane with a plurality of regions offset from the corresponding warped divisional region. A warp error value is calculated for each pixel of each divisional region as a function of the scalar offset. The warp error values are interpolated and added to the current position of each pixel of the warped plane.

Separate processing of various types of data contained in a document is disclosed in U.S. Pat. No. 5,060,980 to Johnson et al. issued Oct. 29, 1991 which describes a "form" that includes user modifiable fields and an encoded description of the location, size, type, etc. of the fields to allow for direct programming of a form interpreter. Other information including the processing of the form, encoded data, etc. may be included in the encoded information. A system for creating forms carrying an encoded description of selected attributes of the fields includes means for selecting or creating fields and locating the fields on a form while generating, substantially simultaneously, the encoded description of the selected attributes. A form composer then allows merging of the form and its encoded description for printing or electronic transmission. A system for reading such forms includes a scanner, decoding device, and processor. By reading such forms, data may be entered into or recalled from a data processing system, or a form interpreter may be programmed, locally or remotely, for subsequent handling of forms.

U.S. Pat. No. 5,784,175 to Lee, issued Jul. 21, 1998 discloses a video compression encoder process for compressing digitized video signals representing display motion in video sequences of multiple image frames. The encoder process utilizes object-based video compression to improve the accuracy and versatility of encoding interframe motion and intraframe image features. Video information is compressed relative to objects of arbitrary configurations, rather than fixed, regular arrays of pixels as in conventional video compression methods. This reduces the error components and thereby improves the compression efficiency and accuracy. As another benefit, object-based video compression of this invention provides interactive video editing capabilities for processing compressed video information.

U.S. Pat. No. 5,303,313 to Mark et al. issued Apr. 12, 1994 describes image compression based on symbol matching. An image is "precompressed" prior to symbol matching using run-length encoding. Symbols are then extracted from the run-length representation. A voting scheme is used in conjunction with a plurality of similarity tests to improve symbol-matching accuracy. A template composition scheme wherein the template may be modified based on symbol matches is also disclosed.

U.S. Pat. No. 5,432,870 to Schwartz issued Jul. 11, 1995 discloses a method and apparatus for compressing and decompressing images of documents. More specifically, a method and apparatus for compressing images having a binary extractor, a binary compressor and a JPEG compressor is disclosed. The binary extractor produces a binary image representing an estimate of the binary information in the original image. The binary compressor compresses the binary image. The binary image is also subtracted from the original image to produce a difference image representing the continuous-tone information in the original image. The difference image is then compressed using the JPEG compressor. In this manner, the present invention compresses a document image without having to perform segmentation on the image.

All of the references cited herein are incorporated by reference for their teachings.

Accordingly, although known apparatus and processes are suitable for their intended purposes, a need remains for a method and apparatus that can efficiently process digital image data by separately compressing the various portions of a composite image.

SUMMARY OF THE INVENTION

In one embodiment, the present invention discloses a method of segmenting a pixel map representation of a document which includes the steps of: acquiring a block of the digital image data, wherein the digital image data is composed of light intensity signals in discrete locations; designating a classification for the block and providing an indication about a context of the block; segmenting the light intensity signals in the block into an upper subset and a lower subset based upon the designated classification; generating a selector set which tracks the light intensity segmentation; and separately compressing the digital image data contained in the upper and lower subsets.

In another embodiment, the present invention discloses a method of segmenting a block of digital image data into an upper and lower subset, wherein the block of data is composed of light intensity signals in discrete locations, including: determining whether the block is located on an edge in the digital image; if the block is on an edge, comparing a magnitude of each light intensity signal in the block to a brightness threshold and placing the signal in the upper subset if the light intensity magnitude exceeds the brightness threshold or in the lower subset if the light intensity magnitude is less than the brightness threshold; and if the block is not located on an edge, placing the block in the upper subset if the block is in a group of blocks that have light intensity values which are indicative of smooth and dark image data, and otherwise placing the block in the lower subset.

In still another embodiment, the present invention discloses a method of classifying a block of digital image data into one of a plurality of image data types, wherein the block of data is composed of light intensity signals in discrete locations, which includes: dividing the block into a bright region and a dark region; dividing a low pass filtered version of the block into a bright region and a dark region; calculating average light intensity values for each of the bright region, the dark region, the filtered bright region and the filtered dark region; and comparing a difference between the bright region and the dark region average light intensity values to a filtered difference between the bright region and the dark region average filtered light intensity values; if the average light intensity difference and the average filtered light intensity difference are approximately equal finding a range of values in which the difference value falls, and classifying the block based upon the value range; and if the average light intensity difference and the average filtered light intensity difference are not approximately equal finding a range of values in which the filtered difference value falls and classifying the block based upon the filtered value range.

DESCRIPTION OF THE INVENTION

The present invention is directed to a method and apparatus for separately processing the various types of data contained in a composite image. While the invention will described in a Mixed Raster Content (MRC) technique, it may be adapted for use with other methods and apparatus' and is not therefore, limited to a MRC format. The technique described herein is suitable for use in various devices required for storing or transmitting documents such as facsimile devices, image storage devices and the like, and processing of both color and grayscale black and white images are possible.

A pixel map is one in which each discrete location on the page contains a picture element or "pixel" that emits a light signal with a value that indicates the color or, in the case of gray scale documents, how light or dark the image is at that location. As those skilled in the art will appreciate, most pixel maps have values that are taken from a set of discrete, non-negative integers.

For example, in a pixel map for a color document, individual separations are often represented as digital values, often in the range 0 to 255, where 0 represents no colorant (i.e. when CMYK separations are used), or the lowest value in the range when luminance-chrominance separations are used, and 255 represents the maximum amount of colorant or the highest value in the range. In a gray-scale pixel map this typically translates to pixel values which range from 0, for black, to 255, for the whitest tone possible. The pixel maps of concern in the currently preferred embodiment of the present invention are representations of "scanned" images. That is, images which are created by digitizing light reflected off of physical media using a digital scanner. The term bitmap is used to mean a binary pixel map in which pixels can take one of two values, 1 or 0.

Figure 1:
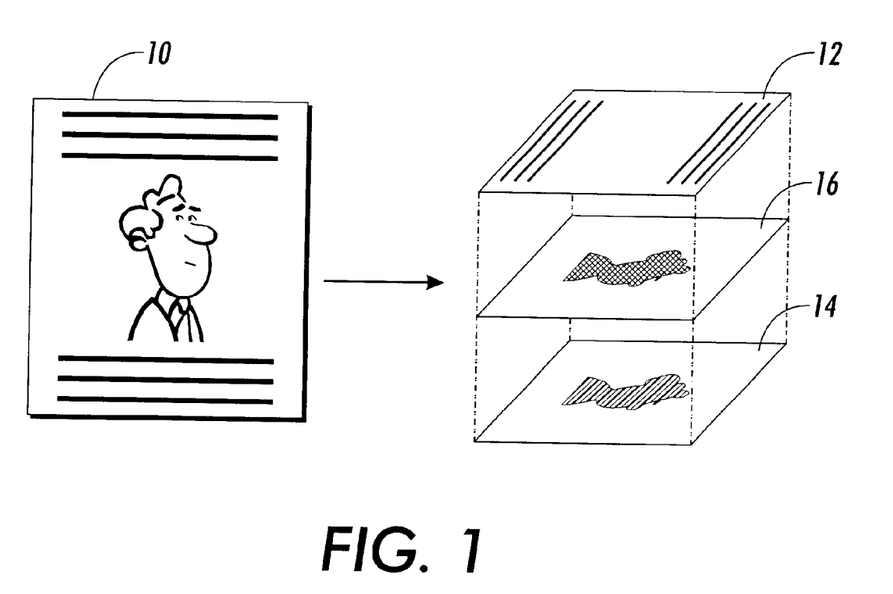
FIG. 1 illustrates a composite image and includes an example of how such an image may be decomposed into three MRC image planes—an upper plane, a lower plane, and a selector plane.
Figure 2:
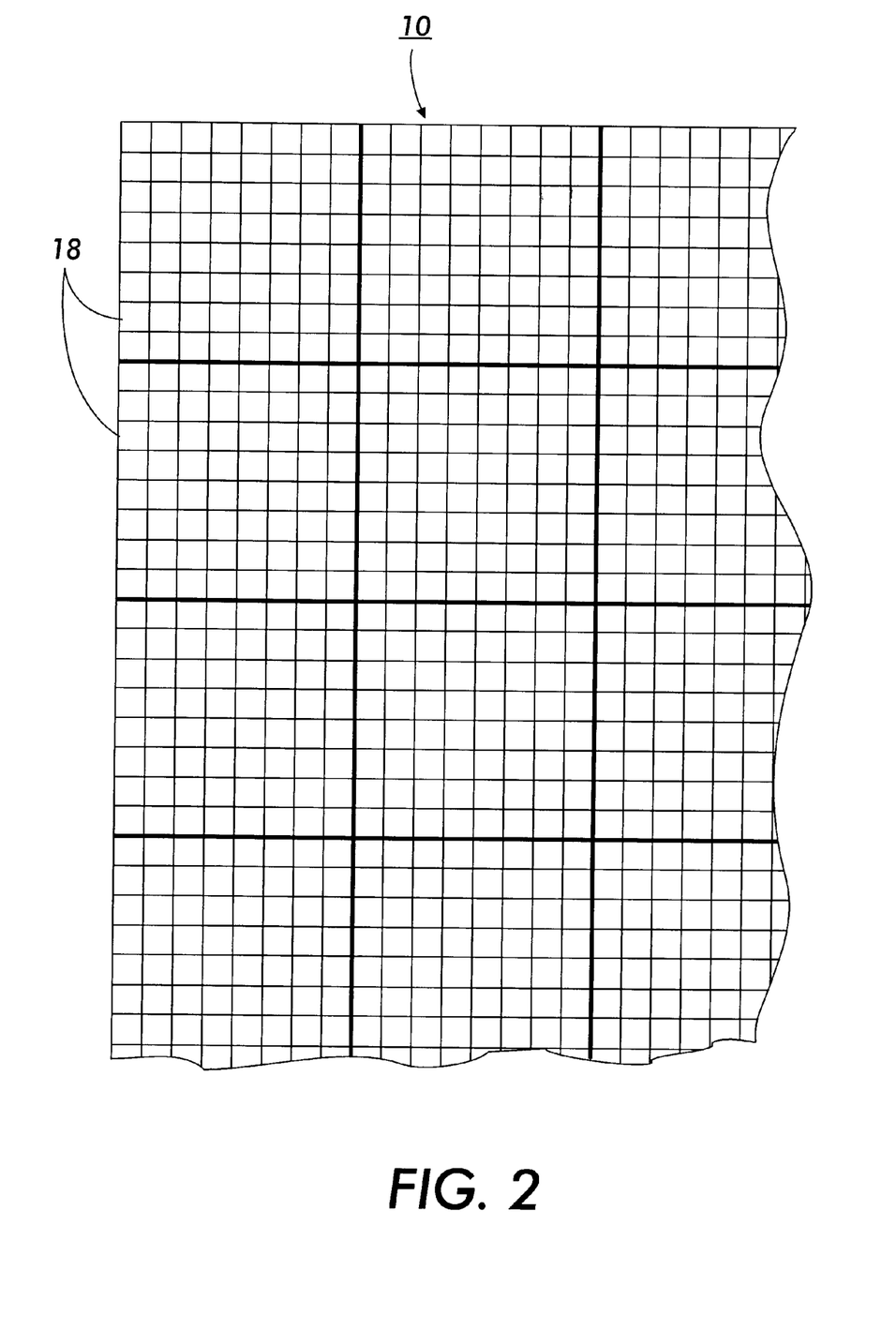
FIG. 2 contains a detailed view of a pixel map and the manner in which pixels are grouped to form blocks.

Turning now to the drawings for a more detailed description of the MRC format, pixel map 10 representing a color or gray-scale document is preferably decomposed into a three plane page format as indicated in FIG. 1. Pixels on pixel map 10 are preferably grouped in blocks 18 (best illustrated in FIG. 2), to allow for better image processing efficiency. The document format is typically comprised of an upper plane 12, a lower plane 14, and a selector plane 16. Upper plane 12 and lower plane 14 contain pixels that describe the original image data, wherein pixels in each block 18 have been separated based upon pre-defined criteria. For example, pixels that have values above a certain threshold may be placed on one plane, while those with values that are equal to or below the threshold are placed on the other plane. Selector plane 16 keeps track of every pixel in original pixel map 10 and maps all pixels to an exact spot on either upper plane 12 or lower plane 14.

The upper and lower planes are stored at the same bit depth and number of colors as the original pixel map 10, but possibly at reduced resolution. Selector plane 16 is created and stored as a bitmap. It is important to recognize that while the terms "upper" and "lower" are used to describe the planes on which data resides, it is not intended to limit the invention to any particular arrangement or configuration.

After processing, all three planes are compressed using a method suitable for the type of data residing thereon. For example, upper plane 12 and lower plane 14 may be compressed and stored using a lossy compression technique such as JPEG, while selector plane 16 is compressed and stored using a lossless compression format such as gzip or CCITT-G4. It would be apparent to one of skill in the art to compress and store the planes using other formats that are suitable for the intended use of the output document. For example, in the Color Facsimile arena, group 4 (MMR) would preferably be used for selector plane 16, since the particular compression format used must be one of the approved formats (MMR, MR, MH, JPEG, JBIG, etc.) for facsimile data transmission.

In the present invention digital image data is preferably processed using a MRC technique such as described above. Pixel map 10 represents a scanned image composed of light intensity signals dispersed throughout the separation at discrete locations. Again, a light signal is emitted from each of these discrete locations, referred to as "picture elements," "pixels" or "pels," at an intensity level which indicates the magnitude of the light being reflected from the original image at the corresponding location in that separation.

Figure 3:
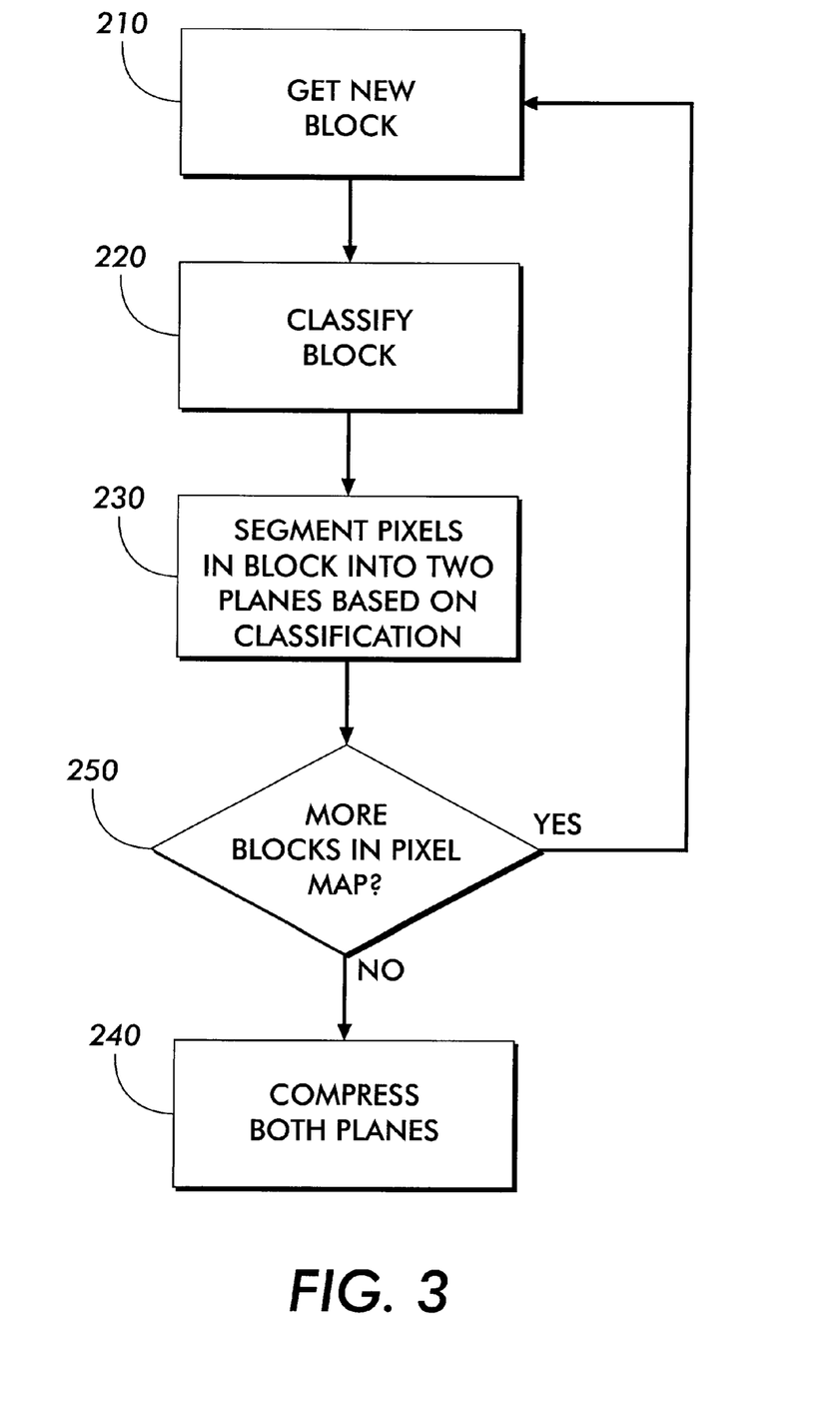
FIG. 3 contains a flow chart which illustrates generally, the steps performed to practice the invention.

In typical MRC fashion, pixel map 10 must be partitioned into two planes 12 and 14. FIG. 3 contains a schematic diagram, which outlines the overall process used to segment pixel map 10 into an upper plane 12 and a lower plane 14 according to the present invention. Block 18 is acquired as indicated in step 210, and is classified as indicated in step 220. In the preferred embodiment of the invention, block 18 will initially be classified as either UNIFORM, SMOOTH, WEAK_EDGE or EDGE, and its context—either TEXT or PICTURE—will be provided. The block will then be reclassified as either SMOOTH or EDGE, depending upon the initial classification and the context. Next, pixels in block 18 are segmented—placed on either upper plane 12 or lower plane 14 according to criteria that is most appropriate for the manner in which the block has been classified as indicated in step 230. This process is repeated for each block 18 in original pixel map 10 until the entire pixel map 10 has been processed. Upper plane 12, lower plane 14 and selector plane 16 are then separately compressed, using a technique that is most suitable for the type of data contained on each, as indicated in step 240.

Figure 4:
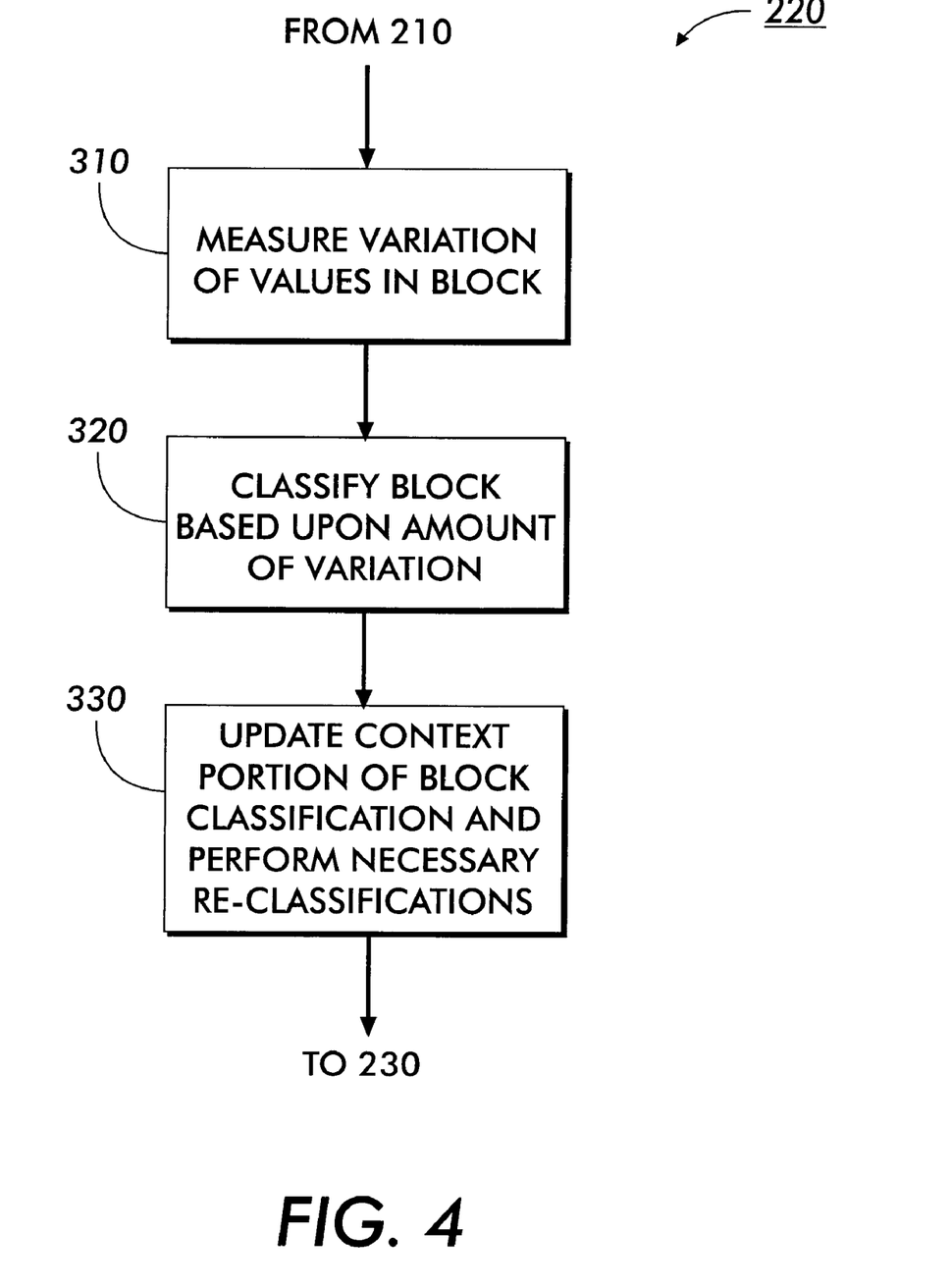
FIG. 4 contains a detailed illustration of the manner in which blocks may be classified according to the present invention.

Turing now to FIG. 4, generally speaking, classification of blocks 18 into one of the four categories in step 220 as described above is preferably completed in three steps. First, the variation of pixel values within the block is determined as indicated in step 310. Block variation is best determined by using statistical measures, which will be described in detail below with reference to FIG. 6. Blocks with large variations throughout are most likely to actually lie along edges of the image, while those containing little variations probably lie in uniform or at least smooth areas. Measuring the variations within the block allows an initial classification to be assigned to it as indicated in step 320. Next, image data within each block 18 is reviewed in detail to allow context information (i.e. whether the region is in the text or picture region of the image) to be updated and any necessary block re-classifications to be performed as shown in step 330. The UNIFORM blocks are reclassified as SMOOTH, and the WEAK EDGE blocks are upgraded to EDGE in a TEXT context or reclassified as SMOOTH in a PICTURE context. A smoothed version 20 of the image is also provided by applying a low pass filter to the pixel map 10. Smoothed image 20 is used in conjunction with original image data to offer additional information during classification, and also provides unscreened data for halftone regions.

Figure 5:
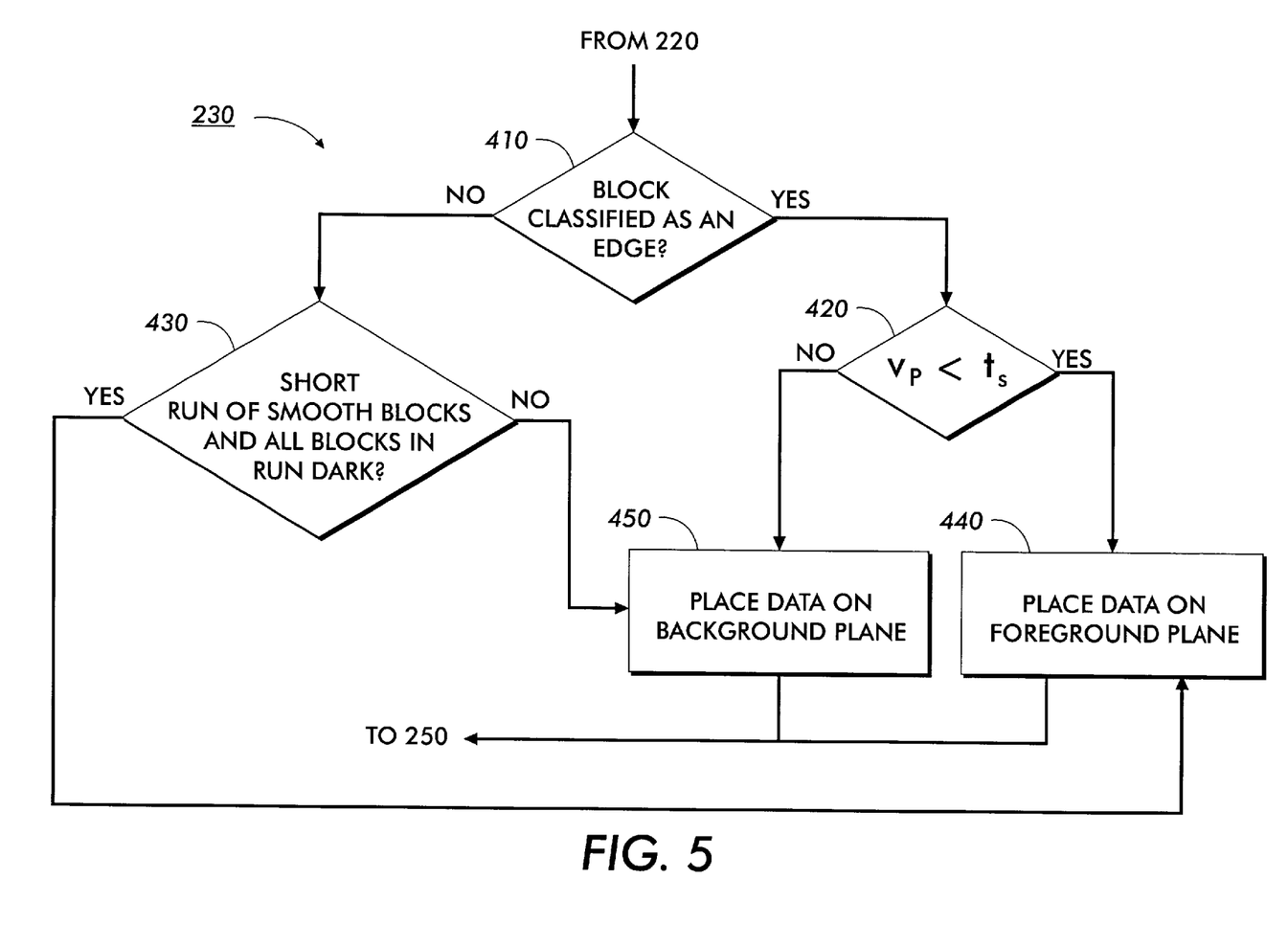
FIG. 5 contains a detailed illustration of the manner in which blocks may be segmented based upon their classification according to the present invention.

FIG. 5 contains details of the manner in which block 18 is segmented into two planes, as provided in step 230 of FIG. 3. The measurement begins by first determining at step 410 whether the block being processed has initially been classified as an EDGE in step 220. If so, the values $v_p$ of each pixel in the block are first compared to a brightness threshold value $t_s$, wherein pixels that have values equal to or above $t_s$ are viewed as "bright" pixels, while those with values below $t_s$ are "dark" pixels. Segmenting EDGE blocks simply includes placing dark pixels on upper plane 12 as indicated in step 440, and placing bright pixels on lower plane 14 as indicated in step 450. If it is determined at step 410 that block 18 is not an EDGE, all pixels in the block are processed together, rather than on a pixel by pixel basis. Segmenting of SMOOTH (non-EDGE) pixels occurs as follows: if block 18 is in the midst of a short run of blocks that have been classified as SMOOTH, and further, all blocks in this short run are dark (v<t)—all data in the block is placed on upper plane 12. If the entire block 18 is substantially smooth (i.e. in a long run) or is bright (in a short run of bright pixels), all data in block 18 is placed on lower plane 14.

Figure 6:
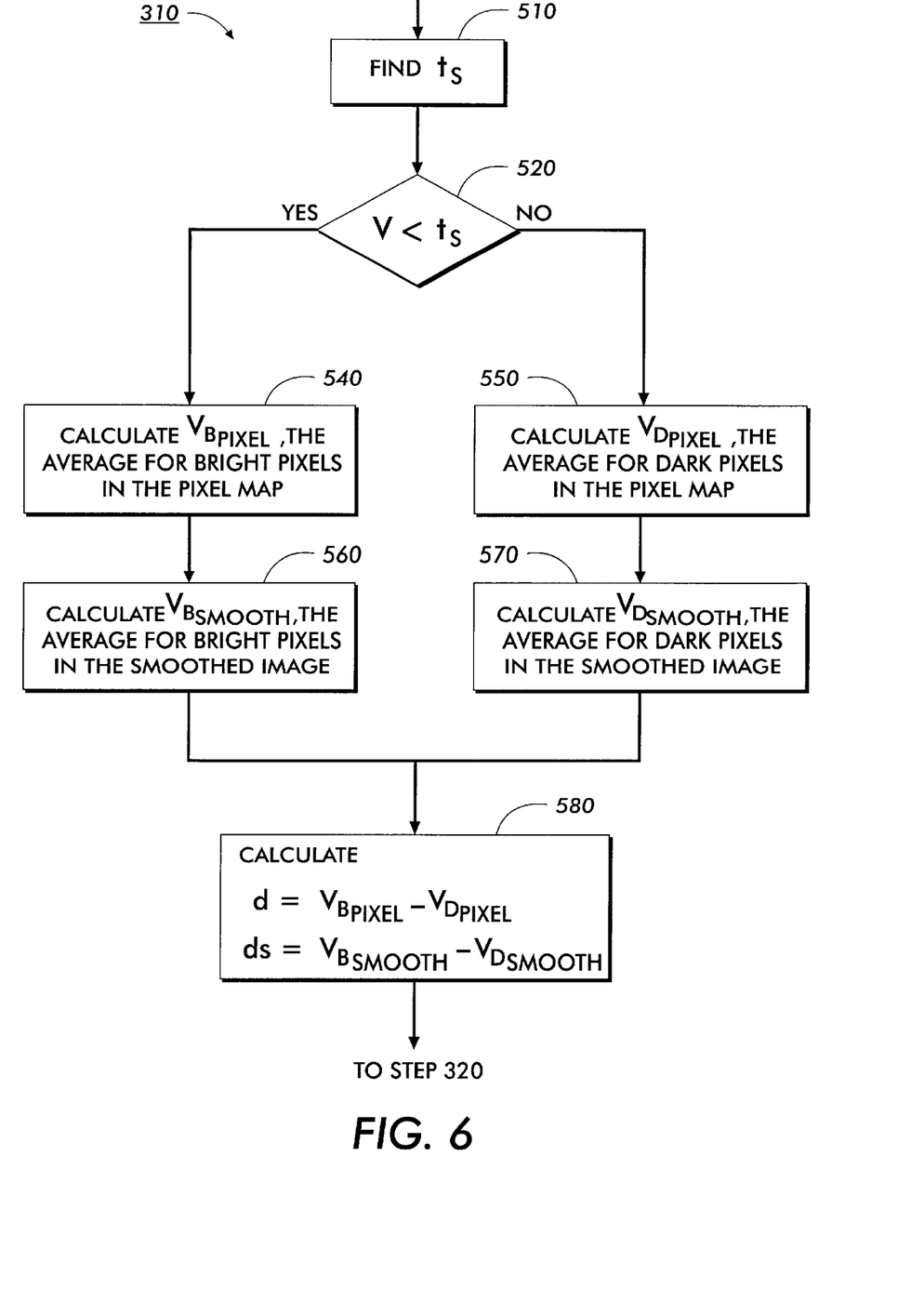
FIG. 6 contains the details of one embodiment of the manner in which block variation can be measured as required by the embodiment of the invention shown in FIG. 4.

Turning now to FIG. 6, the details of one embodiment of the invention wherein initial block classification via block variation measurement may be accomplished as required by step 310 (FIG. 4) are now described. A threshold, $t_s$, which allows the block to be divided into two portions is first calculated as indicated in step 510. In the preferred embodiment of the invention, this threshold is obtained by performing a histogram analysis on the data in the block, but many standard methods can be used to perform this analysis. For example, the value that maximizes between distances of the criteria being used for separation or provides for maximum separation between the two portions of the block can be selected. Those skilled in the art will recognize that other methods of choosing the best threshold are available and the invention is not limited to this embodiment. Block 18 is then thresholded into these two parts by comparing the light intensity value of each pixel to the selected threshold $t_s$, as indicated in step 520. As before, if the pixel value $v_p$ is less than the threshold, the pixel is referred to as dark. If $v_p$ is greater than or equal to $t_s$, the pixel is bright.

As stated earlier, a smooth version 20 of the image is obtained by applying a low pass filter to the original image data. Average values for bright and dark pixels are then obtained for both the original and smoothed sets of image data. Looking first at the bright pixels, one value calculated will be $v_{BPIXEL}$, the average value for all of the bright pixels in original pixel map 10 ($v_p \geq t_s$) which are located in the area covered by block 18 as indicated in step 540. Another value, $v_{BSMOOTH}$, the average value for all of the bright pixels in smoothed version 20 of the image which are located in the area covered by block 18 will also be obtained as shown in step 560. Dark values are calculated similarly. That is, $v_{DPIXEL}$, the average value for all of the dark pixels in original pixel map 10 ($v_p < t_s$) which are located in the area covered by block 18 will be obtained as shown in step 550, and $v_{DSMOOTH}$, the average value for all of the dark pixels in the smoothed version 20 of the image which are located in the area covered by block 18 will be obtained as in step 570. Once these average values are obtained, the distances d and $d_s$ between brighter and darker averages for pixel map 10 and smoothed image 20 respectively are calculated as indicated in step 580. That is $d = v_{BPIXEL} - v_{DPIXEL}$, and $d_s = v_{BSMOOTH} - v_{DSMOOTH}$. Since $d/d_s$ is typically almost equal to 1 for contone images, the ratio of $d/d_s$ may be used to detect halftones.

Figure 7:
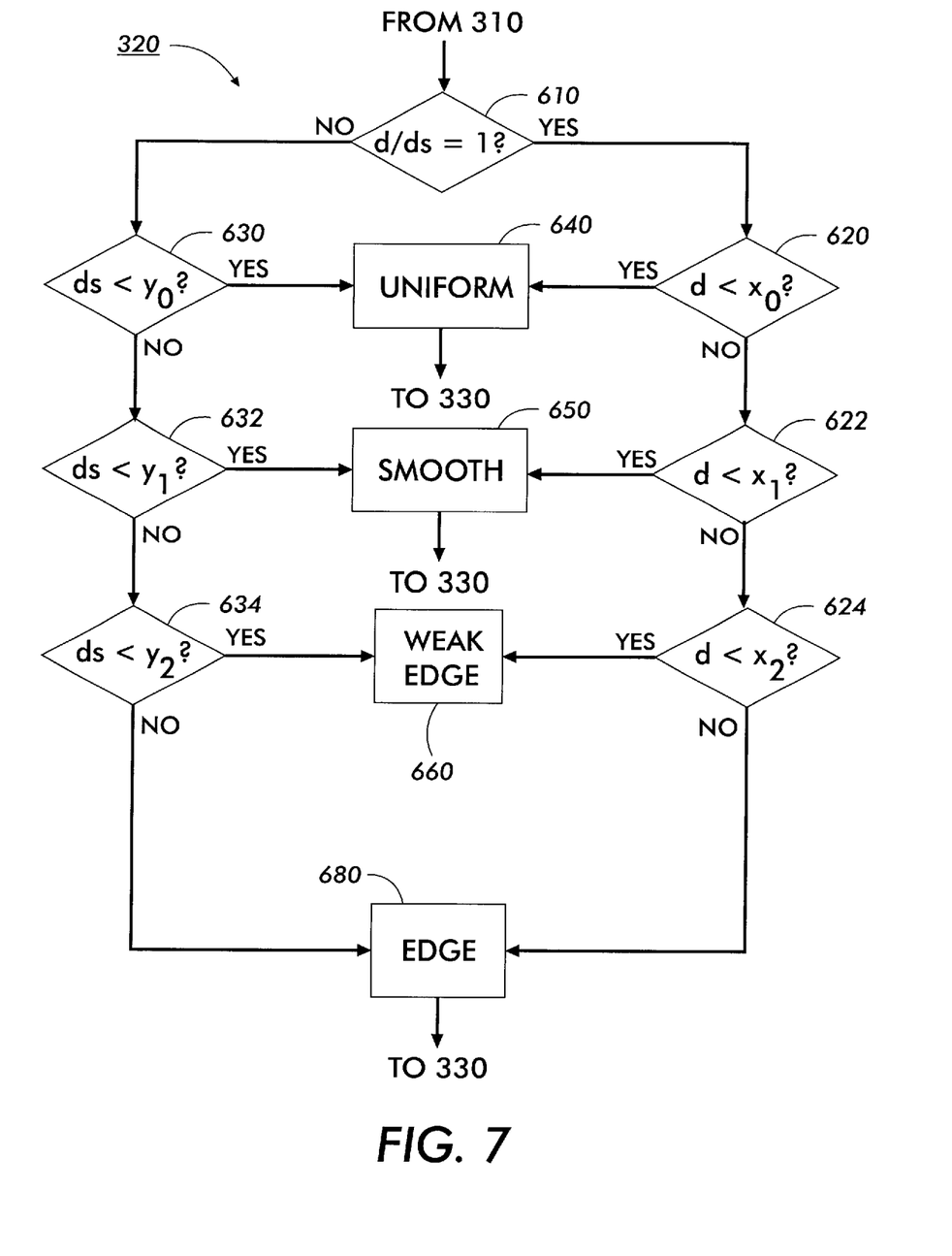
FIG. 7 contains the details of an embodiment of the invention describing classification of blocks based upon the block variation measurement provided in FIG. 6.

FIG. 7 contains a detailed illustration of step 320 of FIG. 4, the preferred embodiment of a process for initially classifying blocks 18. As shown, a relative comparison between d and $d_s$ is obtained as indicated in step 610 in order to determine whether the block contains contone ($d \approx d_s$) or halftone data. Block 18 will initially be classified as one of four types: UNIFORM, SMOOTH, WEAK EDGE or EDGE according to the magnitude of the distance d or $d_s$. Distance d is used to classify contone blocks, while distance $d_s$ is used for halftones. For contone data d, the value from pixel map 10, is compared to value $x_0$ as shown in step 620.

If d is very low (i.e. $d < x_0$), all pixel values in the block are substantially the same and the block is classified as UNIFORM at step 640. If there are somewhat small differences in pixel values in the block such that $x_0 < d < x_1$ as shown in step 622, the block is classified as SMOOTH, at step 650. If there are fairly large differences in pixel values in the block and $x_1 < d < x_2$ at step 624, the block will be classified as WEAK EDGE. If the differences in the block are very large and $d \geq x_2$ at step 624, the block will be classified as an EDGE at step 670.

If $d/d_s$ is not approximately equal to 1, $d_s$ is compared to threshold $y_0$ at step 630. It should be noted there that two different sets of thresholds are applied for halftones and contones. Thus, on most occasions, $x_0 \neq y_0$, $x_1 \neq y_1$, and $x_2 \neq y_2$. The process used to classify halftone blocks is similar to that used for contone data. Thus, if $d_s < y_0$ at step 630 the block is classified as UNIFORM at step 640. If $y_0 < d_s < y_1$ in step 632, the block is classified as SMOOTH, at step 650. If $y_1 < d_s < y_2$ as indicated in step 634, the block is classified as a WEAK EDGE at step 660. If $d \geq x_2$ at step 634, the block will be classified as an edge at step 670.

Figure 8:
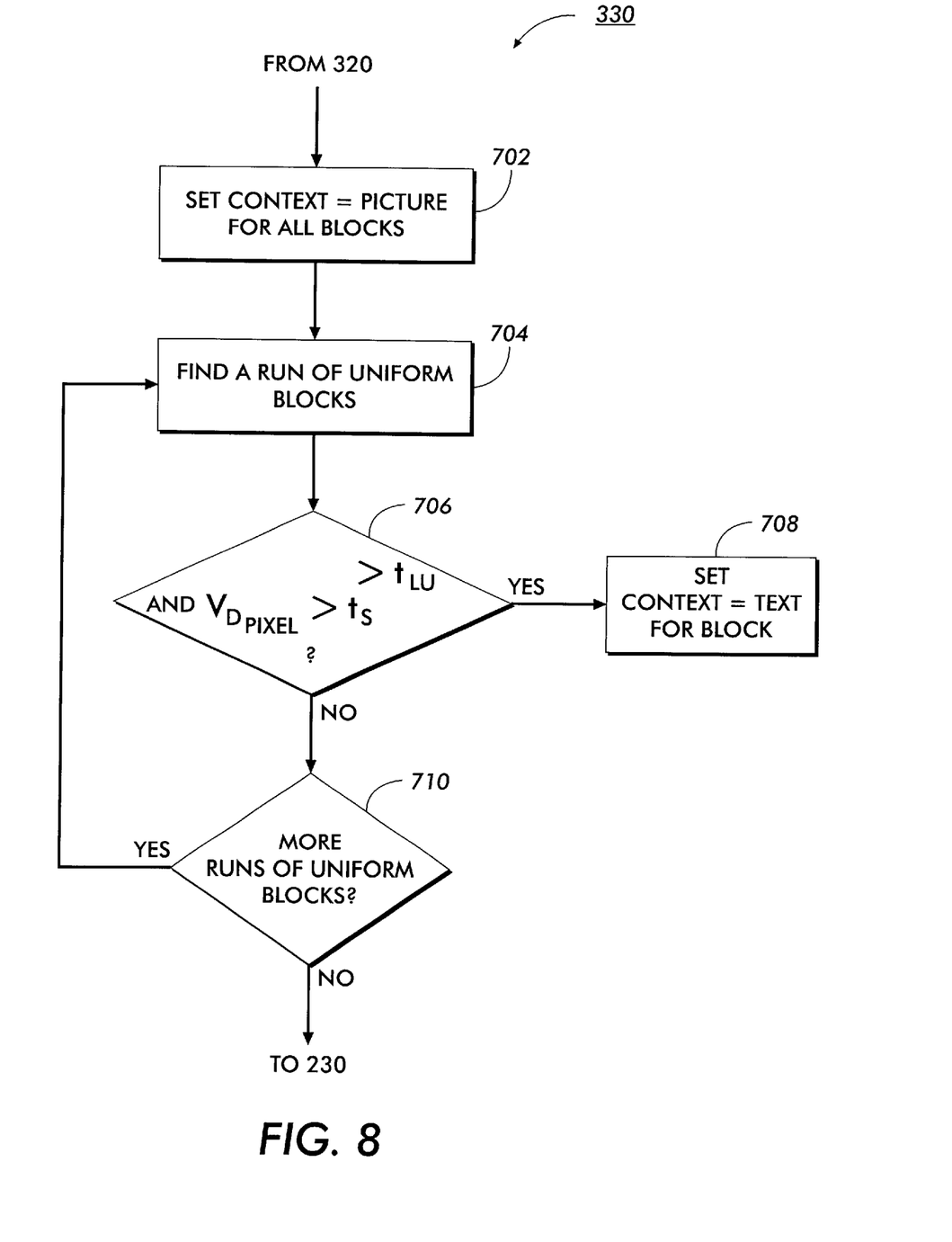
FIG. 8 contains the details of an embodiment of the invention for which context may be updated based upon the block classification provided in FIG. 7.
Figure 9:
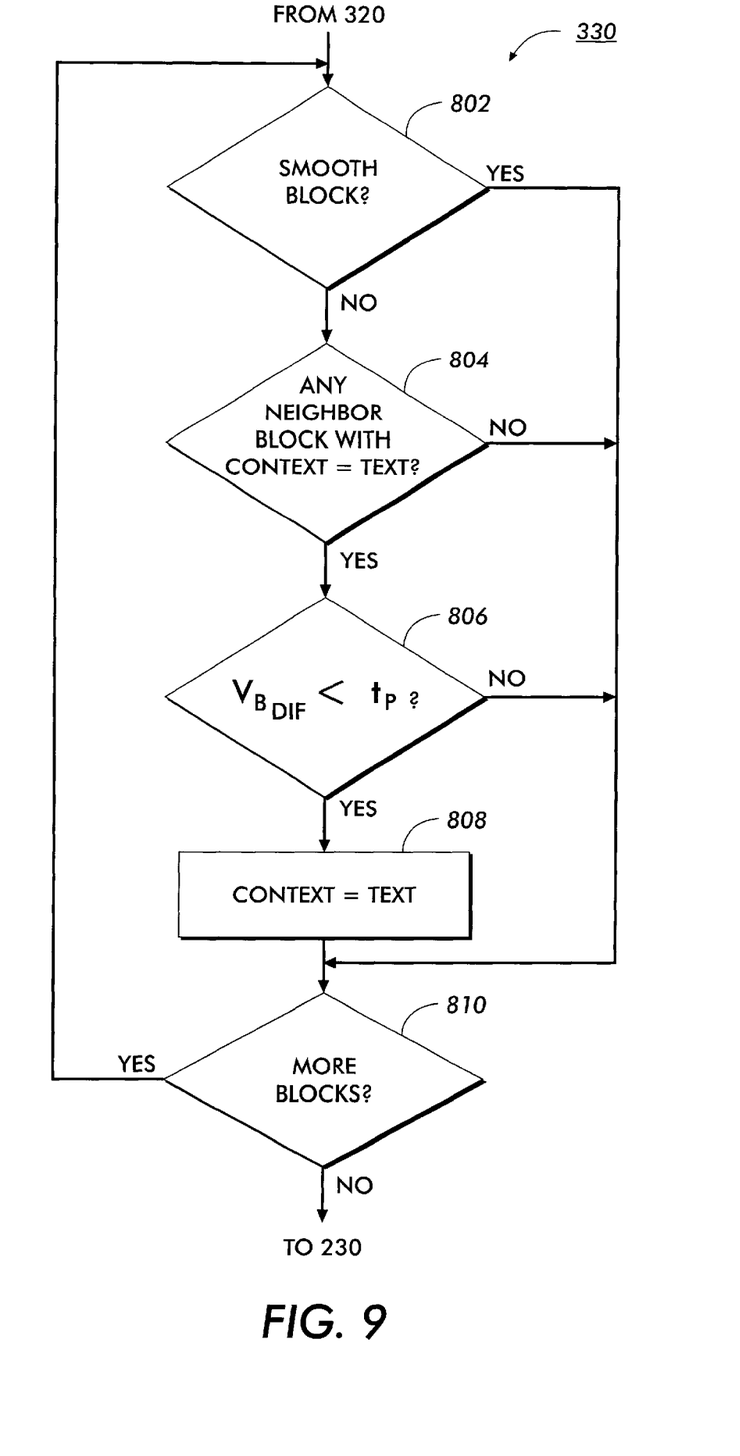
FIG. 9 contains the details of another embodiment of the invention for updating context based upon block classification as provided in FIG. 7.

Referring now to FIGS. 8 and 9, the details for updating the context of the block will now be provided. The context of a block is useful when the average between the dark and bright areas of the block is relatively high. When this is the case, the block can classified as an EDGE as long as its context is TEXT. The context is initially set equal to PICTURE. It is changed to TEXT if one of two rules is satisfied: (1) the block being processed is in a long run of UNIFORM blocks and the average of the dark pixel values in the block is greater than a preset brightness threshold; or (2) the block has been classified as either UNIFORM, WEAK EDGE, or EDGE, one of the top, left or right neighboring blocks has a context which has been set equal to TEXT, and the difference between that neighboring block and the current block is smaller than a preset propagation threshold.

Turning first to FIG. 8, determining whether block context should be changed according to the first rule requires finding a run of blocks that have been classified as UNIFORM as indicated in step 704. Finding a run of UNIFORM blocks typically involves comparing the number of consecutive UNIFORM blocks to a run length threshold t,u as indicated in step 706. The run length threshold sets the number of consecutive blocks that must be classified as UNIFORM for a run to be established. As also indicated in step 706, $V_{DPIXEL}$, the average value of the dark pixels for consecutive blocks is compared to the brightness threshold $t_s$. A large number of consecutive UNIFORM blocks with high brightness levels usually indicates that the blocks contain large background page areas (i.e. large white areas), thereby indicating that text is present. Thus, if the number of consecutive UNIFORM blocks exceeds $t_{LU}$ and $V_{DPIXEL} < t_s$, the context for the block is changed to TEXT as indicated in step 708.

If either the number of identified consecutive blocks is too small to establish a run or the blocks are dark ($V_{PIXEL} \leq t_s$), the context will remain set equal to PICTURE. Whether additional runs are present in the block will be determined as indicated in step 710, and if so the process will be repeated as indicated in the illustration.

Turning now to FIG. 9, changing the context of a block to TEXT under the second rule first requires providing a propagation threshold $t_p$. The propagation threshold defines the level of brightness that will indicate that the block covers blank page areas. Under the second rule, the context will be changed from picture to text at step 808 if the block is not SMOOTH (i.e. is UNIFROM, and EDGE or a WEAK EDGE) as shown in step 802, either its top, left or right neighbor has a text context as indicated in step 804 and $V_{BDIF}$, the average difference between bright pixels in the block and bright pixels in the neighbor text context block is less than $t_p$ as shown in step 806. Neighbor blocks are checked because presumably blocks that contain text will be located next to other blocks that contain text. However, the brightness value of the block is compared to that of its neighbor to assure that this is the case. In other words, even if the block has a neighboring block with a text context, a large difference between the average brightness of block and its neighbor means that the block contain does not contain the large blank page areas that indicate the presence of text.

Again, the present invention is directed to segmenting the data by first identifying blocks that contain the edges of the image and then separating the blocks such that those which contain the smooth data and bright sides of the edges are placed on the lower plane and the dark sides of the edges are placed on the upper plane. Once each of the respective planes is generated, ordinary MRC processing continues. That is, each plane is compressed using an appropriate compression technique. In the currently preferred embodiment, upper plane 12 and lower plane 14 are compressed using JPEG while the selector plane 16 is compressed using a symbol based pattern matching technique such as CCITT Group IV or a method of classifying scanned symbols into equivalence classes such as that described in U.S. Pat. No. 5,778,095 to Davies issued Jul. 7, 1998, the contents of which are is hereby incorporated by reference. The planes are then joined together and transmitted to an output device, such as a facsimile machine or storage device.

In the preferred embodiment of the invention, any or all of these methods may be implemented in a computer any other device capable of storing a set of instructions which may be executed by a machine. The program storage device will tangibly embody this set of instructions (most often referred to as a software program) to perform the above previously recited steps for compressing a document image in the manner described in detail above with reference to the attached figures.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A method of segmenting digital image data for mixed raster content processing, comprising:
   a) acquiring a block of the digital image data, wherein the digital image data is composed of light intensity signals in discrete locations;
   b) designating a classification for said block and providing an indication about a context of said block;
   c) segmenting said light intensity signals in said block into an upper subset and a lower subset based upon said designated classification;
   d) generating a selector set which tracks said light intensity segmentation; and
   e) separately compressing the digital image data contained in said upper and lower subsets;
   wherein said block is classified as one of either substantially uniform data, substantially smooth data, substantially weak edge data, or substantially edge data, and further comprising;
      i. measuring an amount of light intensity signal variation throughout said block;
      ii. assigning a classification to said block based upon said measured light intensity signal variation; and
      iii. updating said context indication for said block, and designating said classification for said block based upon said updated context.

2. A method of segmenting digital image data as claimed in claim 1 wherein said classification indicates that said block contains substantially smooth data.

3. A method of segmenting digital image data as claimed in claim 1 wherein said classification indicates that said block contains substantially edge data.

4. A method of segmenting digital image data as claimed in claim 1 wherein said light intensity signal segmenting step further comprises:
   a) determining whether said block classification is edge;
   b) if said block classification is edge, assigning dark signals in said block to said lower subset, and assigning bright signals in said block to said upper subset; and
   c) if said block classification is not edge, placing said block in said upper subset if said block is in a dark section of said image and otherwise placing said block in said lower subset.

5. A method of segmenting digital image data as claimed in claim 4 wherein a dark signal is defined as one that has a light intensity value that is less than a brightness threshold value, and a bright signal is one that has a light intensity value above said brightness threshold value.

6. A method of segmenting digital image data as claimed in claim 4 wherein a dark section of said image is defined as a location within said block that has a run of consecutive substantially smooth data designated blocks, wherein a number of consecutive substantially smooth data designated blocks is below a run length threshold and wherein all consecutive substantially smooth data designated blocks have average light intensity values below a brightness threshold value.

7. A method of segmenting digital image data as claimed in claim 1 wherein said indication updating step further comprises:
   a) setting a context for all blocks to picture;
   b) finding a run of uniform blocks, wherein a uniform block run is defined as a plurality of consecutive uniform designated blocks wherein a number of consecutive designated blocks exceeds a run length threshold; and
   c) changing a context to text if said average dark signal value for said block run exceeds a brightness threshold.

8. A method of segmenting digital image data as claimed in claim 1 wherein said block signal variation measurement step further comprises:
   a) dividing said block into a bright region and a dark region;
   b) calculating average light intensity values for said bright region and for said dark region; and
   c) obtaining a difference in average light intensity values between said bright region and said dark region.

9. A method of segmenting digital image data as claimed in claim 8 wherein said indication updating step further comprises changing a context to text if said block substantially contains a background page portion of the digital image data.

10. A method of segmenting digital image data as claimed in claim 8 wherein said indication updating step further comprises for blocks that have not been classified as smooth, changing a context to text if a context of a top, left or right neighboring block is text and a difference between said text context neighbor block average bright region light intensity value and said block average bright region light intensity value is less than a propagation threshold value.

11. A method of segmenting digital image data as claimed in claim 8 further comprising:
   a) dividing a low pass filtered version of said block into a bright region and a dark region;
   b) calculating average filtered light intensity values for said bright region and for said dark region; and
   c) obtaining a difference in average filtered light intensity values between said bright region and said dark region.

12. A method of segmenting digital image data as claimed in claim 11 wherein said dividing step includes comparing each light intensity signal value in said block to an edge threshold and designating signals with values below said threshold as dark signals and signals with values above said threshold as bright signals.

13. A method of segmenting digital image data as claimed in claim 10 wherein said edge threshold is obtained by performing a histogram analysis on said block.

14. A method of segmenting digital image data as claimed in claim 13 wherein said classification assigning step further comprises:
   a) identifying a range of values inside of which said difference value falls; and
   b) classifying said block based upon said identified value range.

15. A method of segmenting digital image data as claimed in claim 13 wherein said classification assigning step further comprises:

a) identifying a range of values in which said filtered difference value falls; and b) classifying said block based upon said identified filtered value range.

16. A method of segmenting a block of digital image data as claimed in claim 1, further comprising:

a) determining whether the block is located on an edge in the digital image;

b) if the block is on an edge, comparing a magnitude of each light intensity signal in the block to a brightness threshold and placing said signal in the upper subset if said light intensity magnitude exceeds said brightness threshold or in the lower subset it said light intensity magnitude is less than said brightness threshold; and c) if the block is not located on an edge, placing the block in the lower subset if the block is in a group of blocks that have light intensity values which are indicative of smooth and dark image data, and otherwise placing the block in the upper subset.

17. A method of classifying a block of digital image data into one of a plurality of image data types, wherein the block of data is composed of light intensity signals in discrete locations, comprising:

a) dividing the block into a bright region and a dark region;

b) dividing a low pass filtered version of said block into a bright region and a dark region;

c) calculating average light intensity values for each of said bright region, said dark region, said filtered bright region and said filtered dark region; and d) comparing a difference between said bright region and said dark region average light intensity values to a filtered difference between said bright region and said dark region average filtered light intensity values;

e) if said average light intensity difference and said average filtered light intensity difference are approximately equal finding a range of values in which said difference value falls, and classifying said block based upon said value range; and f) if said average light intensity difference and said average filtered light intensity difference are not approximately equal finding a range of values in which said filtered difference value falls and classifying said block based upon said filtered value range.

18. A method of segmenting digital image data as claimed in claim 17 wherein said block classification step further comprises:

a) comparing said difference value to a uniform threshold;

b) classifying said block as uniform if said difference value is less than said uniform threshold;

c) comparing said difference value to a smooth threshold if said difference value is not less than said uniform threshold, and classifying said block as smooth if said difference value is less than said smooth threshold;

d) comparing said difference value to an edge threshold if said difference value is not less than said smooth threshold, and classifying said block as a weak edge if said difference value is less than said edge threshold; and e) classifying said block as an edge if said difference value is not less than said edge threshold.

* * * * *